United States Patent [19]

Kinzel

[11] Patent Number: 4,942,313
[45] Date of Patent: Jul. 17, 1990

[54] METHOD FOR DETECTING A CURRENT FLOWING OVER THE HUMAN BODY BETWEEN A FORWARD AND A RETURN CONDUCTOR AND A CIRCUIT CONFIGURATION FOR CARRYING OUT THE METHOD

[75] Inventor: Helmut Kinzel, Weinheim, Fed. Rep. of Germany

[73] Assignee: Asea Brown Boveri Aktiengesellschaft, Mannheim, Fed. Rep. of Germany

[21] Appl. No.: 233,242

[22] Filed: Aug. 17, 1988

[30] Foreign Application Priority Data

Aug. 29, 1987 [DE] Fed. Rep. of Germany ....... 3728906

[51] Int. Cl.$^5$ .................... H02H 1/02; A61B 17/36
[52] U.S. Cl. .................... 307/326; 361/42; 361/46; 606/35
[58] Field of Search ............... 307/116, 326; 361/42–50, 100, 110, 232; 128/303.13, 303.14, 303.17, 422; 604/20; 324/72, 133, 514, 524

[56] References Cited

U.S. PATENT DOCUMENTS

| | | | |
|---|---|---|---|
| 3,590,322 | 6/1971 | Carr | 361/42 |
| 3,697,808 | 10/1972 | Lee | 361/46 |
| 3,952,748 | 4/1976 | Kaliher et al. | 128/303.14 |
| 3,987,796 | 10/1976 | Gonser | 128/303.14 |
| 4,089,336 | 5/1978 | Cage et al. | 128/303.14 X |
| 4,094,320 | 6/1978 | Newton et al. | 128/303.14 |
| 4,102,341 | 7/1978 | Ikun et al. | 128/303.14 |
| 4,196,734 | 4/1980 | Harris | 128/303.17 X |
| 4,200,105 | 4/1980 | Gonser | 128/303.14 |
| 4,200,897 | 4/1980 | Dawley | |
| 4,231,372 | 11/1980 | Newton | 128/303.14 |
| 4,301,801 | 11/1981 | Schneiderman | 128/303.14 |
| 4,303,073 | 12/1981 | Archibald | 128/303.13 |
| 4,494,541 | 1/1985 | Archibald | 128/303.13 |
| 4,657,015 | 4/1987 | Irnich | 128/303.13 |
| 4,658,815 | 4/1987 | Farin et al. | 128/303.14 |
| 4,741,334 | 5/1988 | Irnich | 128/303.13 |

FOREIGN PATENT DOCUMENTS

| | | |
|---|---|---|
| 2354154 | 5/1974 | Fed. Rep. of Germany . |
| 3343270 | 6/1985 | Fed. Rep. of Germany . |
| 8400341 | 10/1984 | PCT Int'l Appl. . |
| 553494 | 8/1974 | Switzerland . |

OTHER PUBLICATIONS

Book 19, 1967, vol. 11, pp. 326–329, "Beseitigung zu hoher Berührungsspannungendurch Schutzgeräte".
Book 103, 1982, vol. 21, pp. 1203–1205, Schutzgeräte in Niederspannungs-Gebäudeinstallationen.

Primary Examiner—William M. Shoop, Jr.
Assistant Examiner—Paul Ip
Attorney, Agent, or Firm—Herbert L. Lerner; Laurence A. Greenberg

[57] ABSTRACT

The method and circuit detects a current flow over the human body between a forward conductor and a return conductor, and disconnects the network conductors. The output signal emitted by a current sensor connected to a network conductor is detected and a switch for disconnecting the network conductor is then actuated only at a value of the signal of the current sensor between an upper and a lower threshold value.

13 Claims, 5 Drawing Sheets

METHOD FOR DETECTING A CURRENT FLOWING OVER THE HUMAN BODY BETWEEN A FORWARD AND A RETURN CONDUCTOR AND A CIRCUIT CONFIGURATION FOR CARRYING OUT THE METHOD

The invention relates to a method and a circuit configuration for detecting a current flowing over the human body between a forward and a return conductor and for switching off the network conductors.

It is known to protect networks or mains systems against short circuits and overcurrents by means of line protection switches in which a thermal and an electromagnetic switch, trigger or circuit breaker are provided, in addition to a switch latch for the permanent opening of contacts. The thermal switch operates with a so-called overcurrent and the electromagnetic switch operates with a short circuit current. These line protection switches which switch off when certain network conditions occur, similar to fuses, avoid danger to objects such as houses, etc., for example due to burning. People and animals cannot be protected against the direct action of current by means of these line protection switches.

If, for example, an electric device has a so-called short to ground, if voltage is present at an electrically conductive outer housing thereof and if a person touches such a housing under voltage, there is a danger of muscle cramps in the case of low currents and of cardiac fibrillation with the consequence of death in the case of higher currents, because a current can flow through the person to the earth. These dangers can be avoided by means of fault current protection switches. Such fault current protection switches operate in such a manner that the network conductors are passed as primary windings through a totalizing current transformer. If some of the network current flows to earth, the equilibrium in the totalizing current transformer is changed and a signal is generated on the secondary side of the totalizing current transformer which is processed and used for tripping the fault current protection switch.

The other case where a person, for example a child, touches a forward or network conductor with one hand and the return conductor, which can be a neutral conductor, for example, with the other hand, has been dealt with in the past essentially by measures having been taken to achieve shock protection. The particular danger of small children entering electric devices or open sockets with electrically conductive objects and in doing so exposing themselves to a current flow, can scarcely be eliminated by using contact covers. Even complicated covering devices within a socket can be overcome with clever manipulation.

It is accordingly an object of the invention to provide a method for detecting a current flowing over the human body between a forward and a return conductor and a circuit configuration for carrying out the method, which overcomes the hereinafore-mentioned disadvantages of the heretofore-known methods and devices of this general type and which essentially eliminates the danger to life due to contact of a phase conductor and the neutral conductor.

With the foregoing and other objects in view there is provided, in accordance with the invention, a method for detecting a current flowing over the human body between forward and return network conductors, and for switching off the network conductors, which comprises detecting an output signal emitted by a current sensor connected in one of the network conductors, and actuating a switch, trigger, trip or circuit breaker for switching off the network conductors only if a value of the output signal of the current sensor is between a lower and an upper threshold value.

In accordance with another mode of the invention, there is provided a method which comprises adjusting the lower threshold value to correspond to a body current which is not quite dangerous for the human body, and adjusting the upper threshold value to correspond to a maximum possible body current which can flow through the human body with a network voltage. According to the IEC 64 (CO) 353 safety threshold, the lower body current is 40 mA.

In this connection, the invention utilizes the following findings:

In realistic investigations (see special reprint from E and M, volume 2/84, Professor Biegelmeier: on the additional protection with direct contact by means of fault current protection switches), the maximum effective current in the longitudinal body direction was 189 mA at 200 V. Linearly extrapolated, 220 V would then result in a maximum current of 208 mA, taking into consideration all network over voltages and other influences, and the current through the human body will scarcely exceed 230 to 250 mA at 220 V due to the make up and the ohmic resistance of the human body. If the current flows from the left to the right hand, a so-called heart current factor of 0.4 is obtained. This case is thus less hazardous. With longitudinal current flow, the heart current factor is 1.0 so that this worst case must be used as a basis for the invention.

Assuming thus, that a body current of between 40 and 250 mA which is hazardous to humans, can be caused with a nominal voltage of 220 V, and assuming that smaller currents can flow without risk and greater currents can hardly flow, this window can then be utilized for the invention. Whenever a current increase between 40 and 250 mA is detected, disconnection occurs according to the invention since it has to be assumed that the current flows through a person. If current is already flowing through a load and, in addition, the person is "connected" into the circuit, a change in the current flowing occurs, namely a current increase, and if this current change (increase) is of the order of magnitude of between 40 to 250 mA, the circuit configuration switches off. Naturally, these values can also be changed if there is a need, such as for certain applications also mentioned above.

A particular problem is that there are loads or consumers, that is to say electric devices, which produce a current of 40 to 250 mA when switched on. In most cases, however when switched on these electric devices will absorb a current surge which exceeds the upper threshold of 250 mA. Then, in any case, the circuit configuration detects the fact that a person has not been "connected" into the circuit.

An additional component which absorbs a current pulse when switched on is provided for those devices which do not absorb such a current surge when switched on, for example soldering irons and the like.

Any components which can be used to measure alternating or if necessary, direct currents or voltages, for example ohmic resistors, inductive or capacitive sensors and the like, can be used as a current sensor.

In accordance with a further mode of the invention, there is provided a method which comprises rectifying the output signal of the current sensor in a rectifier, differentiating the rectified output signal in a differentiating section, supplying the rectified output signal to a discriminator circuit after differentiation, and limiting the window of the discriminator circuit by the lower and the upper threshold values.

In accordance with an added mode of the invention, there is provided a method which comprises supplying the rectified output signal of the current sensor to a peak-value forming circuit and then to the differentiating section.

With the objects of the invention in view, there is also provided a circuit configuration for detecting a current flowing over the human body between forward and return network conductors, and for switching off the network conductors, comprising a current sensor connected to one of the network conductors, means for setting upper and lower threshold values of an output signal of the current sensor, a switch, tip, trigger or circuit breaker connected to one of the network conductors, a differentiating section in the form of an RC section connected to the current sensor, and a discriminator circuit having first and second controllable semiconductor switches connected to the RC section, the first controllable semiconductor switch being turned on with a signal of the RC section above the upper threshold value for discharging an output voltage of the differentiating section to ground, and the second semiconductor switch being activated with a signal of the RC section between the upper and lower threshold values for activating the switch.

In accordance with another feature of the invention, the first controllable semiconductor switch is a thyristor having a gate terminal, and there is provided a Zener diode connected to the gate terminal of the thyristor. The upper threshold is then set by selecting the Zener diode voltage.

In accordance with a further feature of the invention, the second controllable semiconductor switch is a transistor having a base terminal, and there is provided an adjustable resistance voltage divider driving the base of the transistor.

In accordance with an added feature of the invention, the second controllable semiconductor switch is a threshold-value transistor circuit.

In the normal case, the forward and the return conductors are a phase conductor and the neutral conductor. Naturally, a different return line can also be provided, for example a protective conductor or an grounding conductor.

Naturally, the possibility also exists to carry out the method with electronic components which can be considered to be known per se. Such components have been essentially known on the basis of comparing and/or amplifier circuits, for example from the German publication by Tietze and Schenk entitled "Halbleiter-Schaltungstechnik" (Semiconductor Circuit Technology), seventh edition, Springer publishers, Berlin, Heidelberg, New York, Tokyo. Accordingly, besides semiconductor elements, the invention also contemplates the use of components described in that publication, particularly because such components generally also operate with a lower signal voltage value. Thus, all types of current sensors can be used, even ohmic sensors.

Accordingly, with the objects of the invention in view, there is furthermore provided a circuit configuration for detecting a current flowing over the human body between forward and return network conductors, and for switching off the network conductors, comprising a current sensor connected to one of the network conductors, means for setting upper and lower threshold values of an output signal of the current sensor, a switch, trip, tigger or circuit breaker connected to one of the network conductors, a rectifier connected to the current sensor for rectifying the output signal thereof, a differentiator connected to the rectifier for differentiating the rectified output signal, and a discriminator circuit connected to the differentiator having a window limited by the upper and lower threshold values. The rectifier, the differentiator, and the discriminator circuit may be formed of comparator and/or amplifier circuits.

In accordance with another feature of the invention, the rectifier is a two-way rectifier, and there is provided an input amplifier with over-voltage and short-circuit protection connected upstream of the rectifier.

In accordance with a further feature of the invention, there is provided a smoothing peak-value forming circuit connected upstream of the differentiator.

In accordance with a concomitant feature of the invention, there is provided an evaluating circuit, and a block forming circuit connected between the discriminator circuit and the evaluating circuit for protected evaluation of the signal.

Other features which are considered as characteristic for the invention are set forth in the appended claims.

Although the invention is illustrated and described herein as embodied in a method for detecting a current flowing over the human body between a forward and return conductor and circuit configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
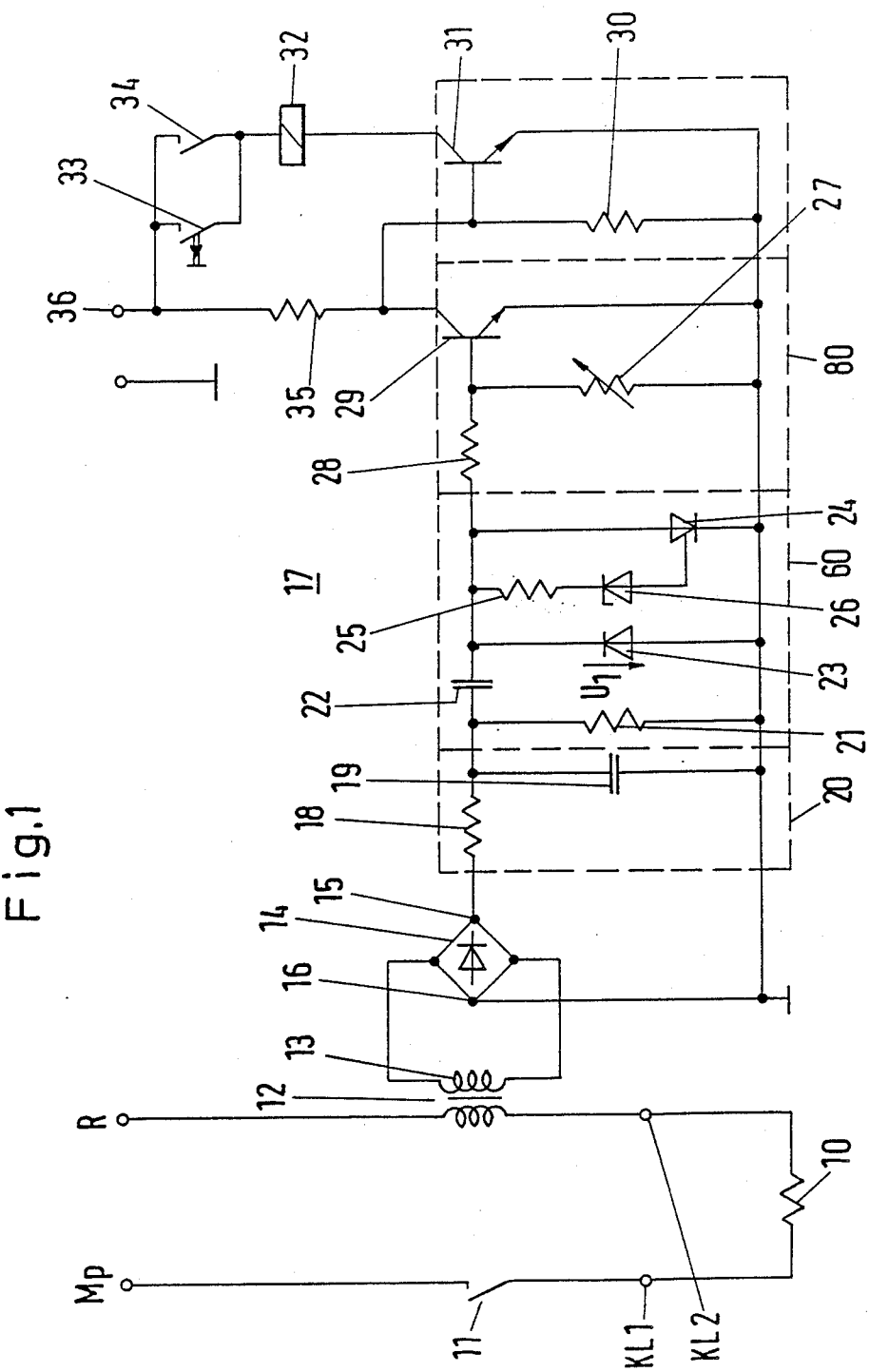
FIG. 1 is a schematic circuit diagram of a circuit configuration for carrying out the method according to the invention.

Referring now to the figures of the drawing in detail and first, particularly, to FIG. 1 thereof, there is seen a network or mains system with a phase conductor R and a neutral or mid-point conductor $M_p$, in which a load 10 is located which can be connected by means of a switch, trigger, trip or circuit breaker 11. A transformer 12 which is used as sensor and is inserted in the R line, has a primary winding that is connect into the R line and a secondary winding 13 that is connected in parallel with a fullwave rectifier 14. Output terminals 15 and 16 of the rectifier 14 are connected to the circuit according to the invention which is designated as a whole by reference numeral 17.

The circuit configuration 17 has an RC section with a resistor 18 and a capacitor 19 in a series circuit which is connected to the terminals 15 and 16 and is used as a smoothing device 20. A resistor 21 is connected in parallel with the smoothing device 20 and in parallel with the capacitor 19. The smoothed secondary voltage is picked up at the resistor 21, dropped across it, and processed further. A charging capacitor 22, which is of essential significance for the operation of the circuit configuration 17, is connected in series with the resistor 18. A recovery or free-wheeling diode 23 which follows the charging capacitor 22, is used together with the resistor 21 for discharging the capacitor. A first controllable semiconductor switch in the form of a thyristor 24 is connected in parallel with the diode 23, and a resistor 25 and a Zener diode 26 are connected to the the gate of the thyristor 24. A voltage divider formed of a resistor 28 and an adjustable resistor 27 is connected in parallel with the thyristor 24.

One leg of the resistor 27 is connected through the resistor 28 to the anode of the thyristor 24 and it is also connected to the base of a first transistor 29 forming a second controllable semiconductor switch. The other leg of the resistor 27 is connected to the emitter of the first transistor 29. A further resistor 30 is connected in parallel with the collector-emitter path of the transistor 29. The end of the resistor 30 connected to the collector is also connected to the base of a second transistor 31. The collector-emitter path of the second transistor 31 is preceded by a relay 32 which actuates a normally-closed contact 34 located in the relay-collector-emitter line path of the second transistor 31. A key switch 33 is connected in parallel with the normally-closed contact 34. The key switch 33 activates the circuit configuration after being operated. An additional resistor 35 connected to the positive pole of a supply voltage 36 is located in the collector path of the transistor 29. In addition, the switch or isolator 11 is also opened by the relay 32.

The capacitor 22 forms a differentiating section 80 for a lower threshold value together with the resistors 28 and 27 and the transistor 29. The capacitor 22 also forms a differentiating section 60 for an upper threshold value which will be explained in greater detail below, with the resistor 25 for the Zener diode threshold, the Zener diode 26 and the thyristor 24 (gate-cathode path). The resistor 21 acts as a discharge resistor for the capacitor 19 and it acts as a discharge resistor for the capacitor 22 through the diode 23. Since the capacitor 22 is used for both differentiating sections for the upper and for the lower threshold values, it is not possible to show an exact separation of the differentiating sections 60 and 80. The broken line frame is only intended to indicate the association between the respective components.

Figure 3:
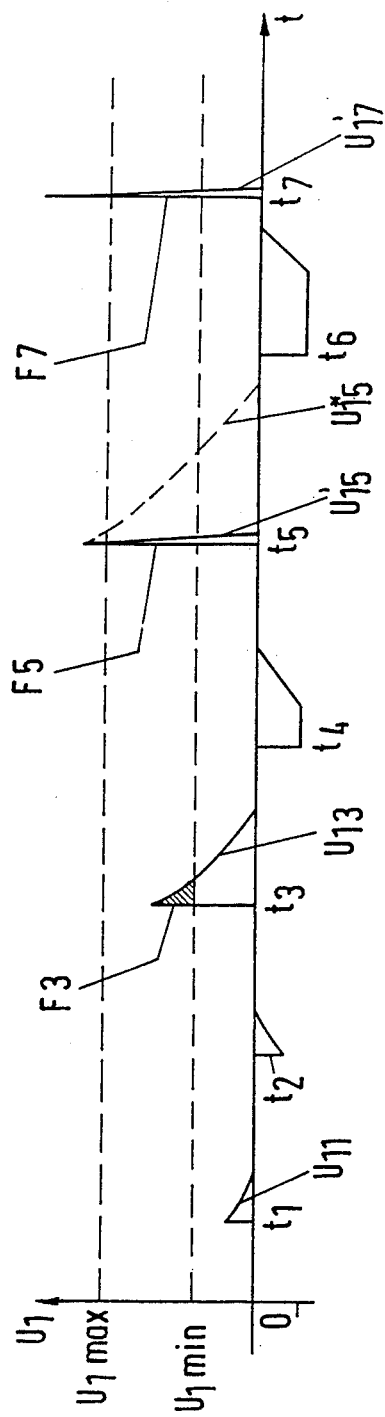
FIG. 3 is a graph of voltage/time and current/time curves of different operating modes.
Figure 3:
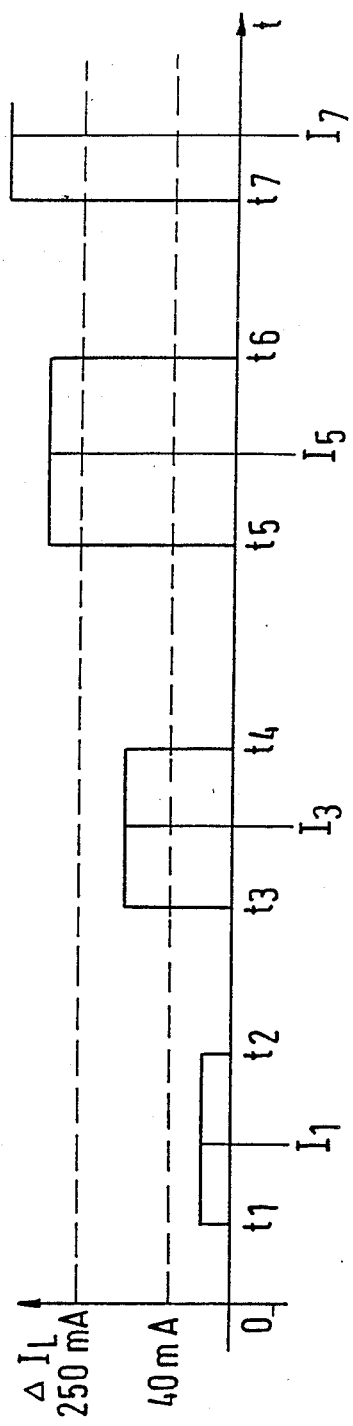

The operation of the circuit is as follows:

If a person touches the phase conductor R and the neutral or mid-point conductor $M_p$ in the vicinity of terminals KL1 and KL2, a current flows through the person which generates a secondary signal at the secondary winding 13 which is rectified in the rectifier 14 and is smoothed in the smoothing section or smoothing device 20. This smoothed signal can be picked up at the resistor 21 and charges the capacitor 22. If the charging state of the capacitor exceeds a particular level or if a voltage of a particular level occurs across the capacitor 22, the subsequent circuit can trip or the thyristor 24 is turned on, that is to say nothing happens. Reference is made to FIG. 3 in this connection. The top of FIG. 3 shows the voltage/time curve occurring in certain cases, including a current/time representation of the load current. It is then assumed that a current $I_1$ occurs at a time $t_1$ due to both terminals KL1 and KL2 being touched. This current $I_1$ is assumed to be below the lower threshold of 50 mA. A secondary-side signal $U_1$ seen in FIG. 1, which corresponds to the charging of the capacitor, has a curve $U_{11}$ seen in FIG. 3. In this case it lies below a lower threshold $U_1$min and because of its dimensioning, the circuit configuration does not trip. The current $I_1$ is also lower than a current which, for example, triggers cardiac fibrillation in a person.

At a time $t_3$, a current $I_3$ which is assumed to flow through the human body is, for example, between 40 mA and 250 mA, and in any case is hazardous and can trigger cardiac fibrillation. The upper limit of 250 mA is an empirically determined limit. At 220 V, no current greater than 250 mA flows through the human body. Due to the current $I_3$, a voltage $U_{13}$ is produced across the resistors 28 and 27 which is above the $U_1$min voltage and has an area F3. This area F3 causes the transistor 29 to be activated, as a result of which this transistor conducts, it cuts off the transistor 31 and in this manner causes the relay 32 to drop off as a result of which the switch 34 and thus the isolator or switch 11 is opened to disconnect the mains or network. The lower threshold $U_1$min is set by suitable adjustment of the resistor 27.

At a time $t_5$, a current $I_5$ is assumed to flow through an electric load or consumer between the terminals $KL_1$ and $KL_2$. This current $I_5$ develops a voltage $U_{15}$ across the resistor 25 and the Zener diode 26, the peak of the voltage being above a value $U_1$max so that a voltage exists which then turns on the Zener diode 26 as a result of which the thyristor 24 is switched to conduct and thus prevents the transistor 29 from being turned on, as a result of which the voltage $U_{15}$ immediately drops in accordance with a curve $U'_{15}$ and does not follow a curve $U^*_{15}$. A variation $U'_{17}$ at a time $t_7$ shows the case of an even higher current. This prevents the tripping by the circuit configuration. At the switch-off times $t_2$, $t_4$ and $t_6$, the corresponding negative variation of the voltage is obtained.

Figure 2:
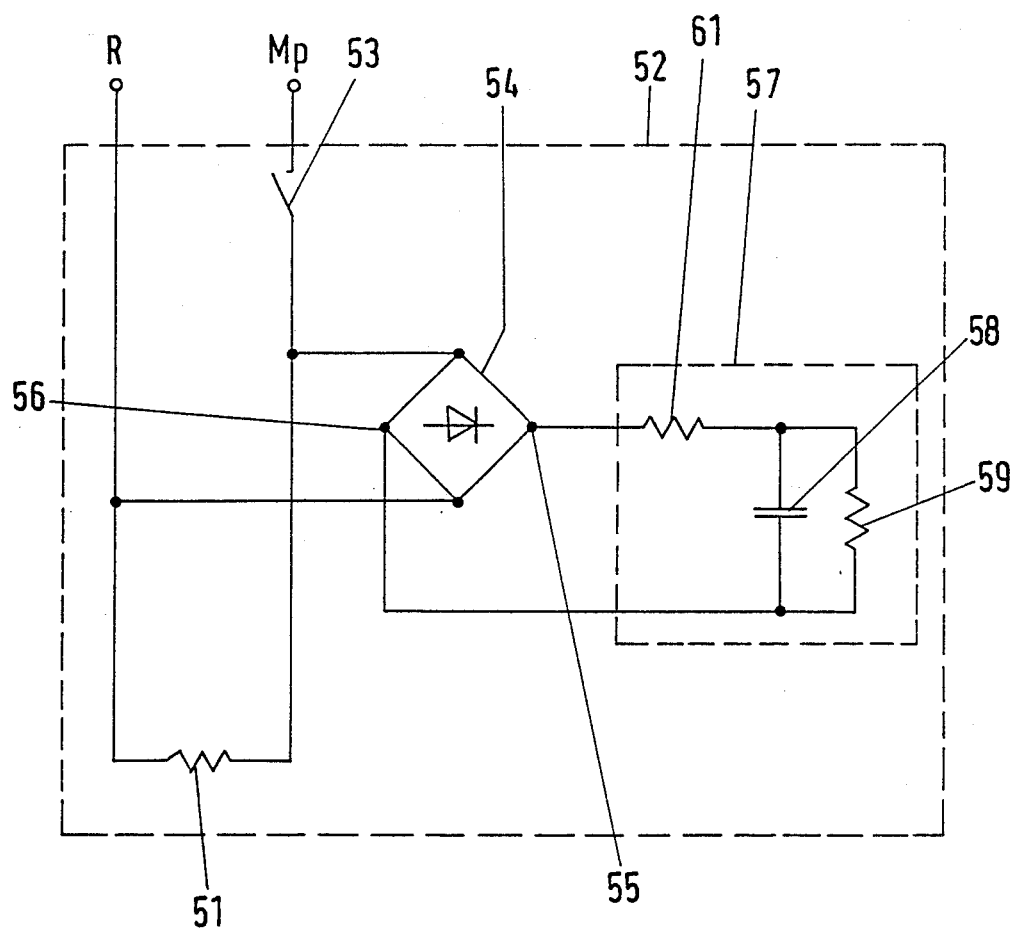
FIG. 2 is a circuit diagram of an additional component in a load.

As explained above, the circuit configuration trips if the voltage $U_1$ is between $U_1$min and $U_1$max. Naturally, there are electric devices with loads such as, for example, soldering irons and similar items, which have a current consumption that corresponds to the current $I_3$. In the case of such loads, an additional circuit is required which absorbs a current pulse that generates an increase in the voltage $U_1$ above the value $U_1$max. This additional circuit can be constructed as shown in FIG. 2. A load 51 can be seen within a device 52 which is connected to the R-$M_p$ mains or network by means of an equipment switch 53. A rectifier 54 which is connected in parallel with the load, has output terminals 55 and 56 that are connected to a pulse generator 57. The pulse generator 57 has a capacitor 58, a high-resistance resistor 59 in parallel with the capacitor and a load limiting resistor 61 which is in series with the parallel circuit of the two components 58 and 59 and with the terminal 55 of the rectifier 54. When the switch 53 is closed, the capacitor 58 charges like a pulse, as a result of which a voltage peak corresponding to voltage peaks F5 or F7 is generated, which causes the thyristor 24 to be turned on.

Instead of the embodiment according to FIG. 1, in which semiconductor switches are provided in order to define the two threshold values, a circuit configuration can also be used in which comparators are essentially provided.

Figure 4:
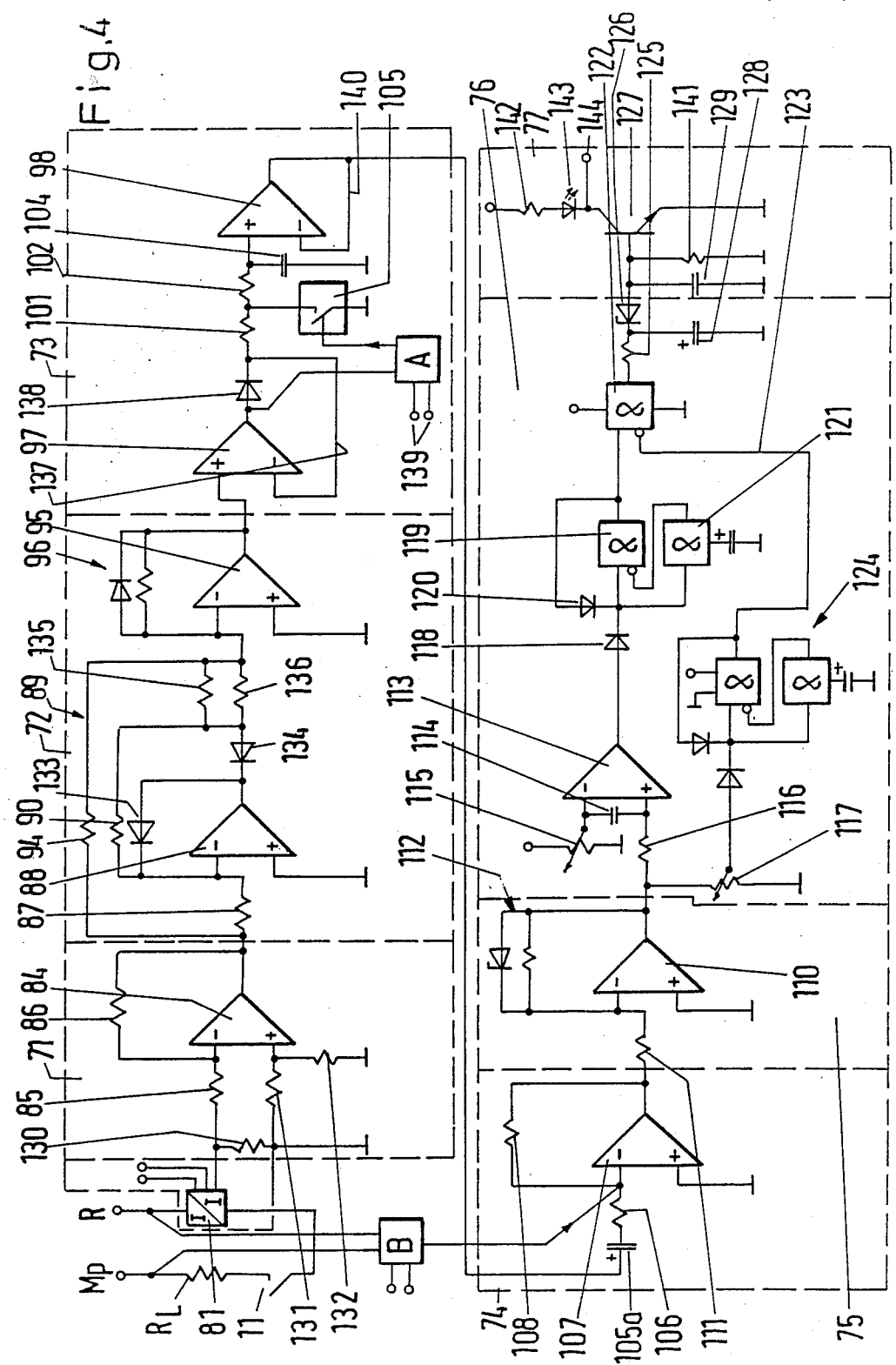
FIG. 4 is a circuit diagram of another circuit configuration for carrying out the method.

Reference will now be made to FIG. 4. The R-$M_p$ network or mains system contains a load which is designated by reference symbol $R_L$. The switch 11 used for disconnecting the circuit is connected in series with this load. A current sensor 81 which is constructed as current transformer, is located in a conductor conducted to a terminal R. An ohmic resistance can be provided instead of a current transformer. The output signal of the current transformer is supplied to an input amplifier 71, which supplies an output signal to a two-way rectifier 72, which in turn supplies an output signal to a maximum-value forming circuit 73. The maximum-value forming circuit is followed by a differentiating amplifier 74, which supplies an output signal to an inverting amplifier 75. The inverting amplifier 75 is followed by a discriminator 76 which is followed by a drive unit 77 for the switch 11. Although all of the components are conventional, they will be considered in greater detail in the text which follows and will be briefly explained, particularly because it has been found that these components allow the invention to be used even with currents of at least 16 A that are already flowing, and with the signals emitted by the sensor being within the milliampere range (approximately 10 mA).

The input amplifier 71 has a first operational amplifier 84 with a negative or inverting input connected through a series resistor 85 to the sensor 81. A resistor 130 is connected to ground between the sensor 81 and the resistor 85. A resistor 131 which is connected to a location between the resistor 130 and ground, has another end connected to the positive or non-inverting input of the operational amplifier 84. A further resistor 132 is connected to ground and to a location between the resistor 131 and the positive or non-inverting input. A feedback resistor 86 is connected between the output and the negative or inverting input of the operational amplifier 84.

The output signal of the input amplifier 71 is supplied through a series resistor 87 to the inverting input of a second operational amplifier 88 whereas the non-inverting input of the operational amplifier 88 is connected to ground. Connected between the inverting input and the output of the operational amplifier 88 is a feedback circuit 89 with a first diode 133 and a second diode 134 is connected. The diode 134 is connected in the output line of the operational amplifier 88. The anode of the diode 133 is connected to a location between the output of the operational amplifier 88 and the diode 134. The anode of diode 134 is connected to a resistor 90. A further feedback resistor 94 is connected in parallel with the resistor 87, the resistor 90 and a parallel circuit of two further resistors 135 and 136. The output signals of the operational amplifier 88 which are achieved as a result of this circuitry, are supplied to the inverting input of a third operational amplifier 95. The non-inverting input of the third operational amplifier 95 is again connected to ground and the output thereof is coupled to the inverting input through a parallel circuit of a diode and a resistor, which is generally designated by reference numeral 96. The two operational amplifiers 88 and 95 with the circuits connected thereto form the two-way rectifier 72. The operation of the two-way rectifier 72 need not be described in greater detail since it is known per se.

The output signal of the two-way rectifier 72 is supplied to the peak-value or maximum-value forming circuit 73 which also has two operational amplifiers 97 and 98. The output signals of the two-way rectifier 72 are supplied to the non-inverting input of the operational amplifier 97. The inverting input of the operational amplifier 97 is connected to the output thereof, with a diode 138 being connected between the output and a feedback connection 137. A device A for controlling the maximum value forming circuit in the case of load disconnection, is connected to a location between the output of the operational amplifier 97 and the anode of the diode 138. The device A is supplied with a voltage through two terminals 139. A series circuit of two resistors 101 and 102 is connected downstream of the connection of the feedback connection 137. A switch 105 is connected between ground and a location between the two resistors 101 and 102. The controlling device A acts on the switch 105. The series circuit of the two resistors 101 and 102 is connected to the non-inverting input of the operational amplifier 98. One leg of a capacitor 104 is connected to a location between the non-inverting input of the comparator 98 and the resistor 102, and the other leg thereof is connected to ground. The switch 105 has the task of discharging the capacitor 104 when the consumer or load is disconnected.

The operation of the maximum-value forming circuit 73 is known per se so that it, too, does not need to be represented and explained in greater detail. The feedback between the output and the non-inverting pole of the operational amplifier 98 is effected by a line 140.

The output of the operational amplifier 98 is connected through a capacitor 105a and a resistor 106 to the inverting input of an operational amplifier 107, having a non-inverting input which is connected to ground and an output which is fed back to the inverting input thereof through a resistor 108. Together, these individual components form the differentiating amplifier 74 which additionally is also influenced by a compensation circuit B that is intended for compensating mains or network voltage fluctuations. On one hand, the compensation circuit B is connected to the conductors R and $M_p$ and on the other hand, it is connected to the inverting input of the operational amplifier 107.

The output of the operational amplifier 107 is connected through a resistor 111 to the inverting input of an operational amplifier 110. The output of the operational amplifier 110 is fed back through a parallel feedback circuit 112 of a resistor and a Zener diode to the inverting input, whereas the non-inverting input is connected to ground. The operational amplifier functions together with the feedback circuit 112 and the resistor 111 as an inverting amplifier, the operation of which is also known per se.

The output signal of the operational amplifier 110 is supplied to the discriminator 76 which has a comparator 113 with an inverting input which is connected through a capacitor 114 to the non-inverting input thereof. A potentiometer or an adjustable resistor 115, at which a lower threshold value can be set, is connected to a location between the capacitor 114 and the inverting input.

The output of the operational amplifier 110 is also supplied through a resistor 116 to the non-inverting input of the operational amplifier or comparator 113. The upper threshold value can be set at a further adjustable resistor 117 which is connected to ground and to a location between the connection of the feedback circuit 112 to the output of the operational amplifier 110 and the resistor 116.

The output of the comparator 113 is connected to a diode 118 which is connected to an AND gate 119. The AND gate 119 is fed back through a diode 120 and the input of a further AND gate 121 is connected between the diode 118 and the AND gate 119. The output of the AND gate 121 is again supplied to the AND gate 119. The output of the AND gate 119 is supplied to an additional AND gate 122, which is connected a line 123 supplying the output of an AND forming circuit 124 originating from the resistor 117. The AND forming circuit 124 is constructed in the same manner as the circuit having the components 118 to 121. The output signal of the AND gate 122 is supplied through a resistor 125 and a Zener diode 126 to the base of a transistor 127. A capacitor 128 is connected to ground and to a location between the resistor 125 and the Zener diode 126. The transistor 127 is connected in a collector-emitter mode and an RC section formed of a capacitor 129 and a resistor 141 is connected in parallel with the base-emitter path of the transistor 127. A resistor 142 with a light-emitting diode 143 (for display) is connected into the collector circuit of the transistor 127. The collector has a terminal 144 which activates a non-illustrated relay that acts on the switch 11 when the transistor is driven to conduct.

The operation both of the discriminator and of the controlling unit are also known per se and will not be described in greater detail for this reason.

Figure 5:
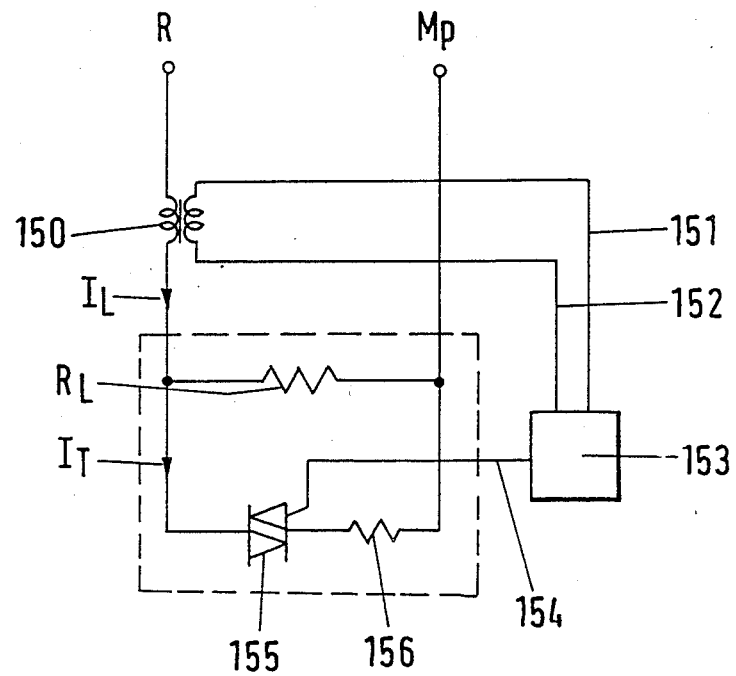
FIG. 5 is a circuit diagram showing an additional part in a consumer or load and a load change (current increase in the "window" range).

FIG. 5 shows an example of the construction of an additional circuit for a device with fluctuating load current which normally leads to a response in the circuit configuration according to FIG. 4, because the load current increase can be within the range allocated to the human body. In order to ensure that the circuit configuration according to FIG. 4 can clearly detect that this is a non-human load, a pulse transmitter is provided which is shown in FIG. 5 and operates as follows: A current sensor, which may be in the form of a current transformer 150, is connected in the conductor R. The sensor 150 has a primary winding being connected in the mains or network conductor R. A current $I_L$ flows through the mains or network conductor and back to the neutral or mid-point conductor $M_p$ through a load $R_L$. If a measurement signal is generated by the current sensor 150 through conductors 151 and 152 which are connected in the secondary winding of the sensor 150, this signal is supplied to an evaluating circuit 153 which is connected through a line 154 to the gate of a triac 155 which is connected in parallel with the load $R_L$. A limiting resistor 156 is connected in series with the triac 155. If a signal is fed through line 154 to the gate of the triac 155, a current pulse $I_T$ is generated which signals to the circuit configuration according to FIG. 4 that a non-human load has been connected, in the event of a current rise of the current $I_L$ between 40 and 250 mA. This prevents disconnection by the circuit configuration according to FIG. 4.

The triac circuit associated with the load $R_L$ can be used, in particular, in the case of such devices in which the current increase with load changes can be within the discriminator range, for example in the case of a video device and similar items.

The foregoing is a description corresponding in substance to German Application No. P 37 28 906.3, dated Aug. 29, 1987, the International priority of which is being claimed for the instant application, and which is hereby made part of this application. Any material discrepancies between the foregoing specification and the aforementioned corresponding German application are to be resolved in favor of the latter.

I claim:

1. Method for detecting a current flowing through a human body between forward and return main network conductors at a given network voltage, and for switching off the main network conductors, which comprises detecting a current increase through the human body by means of an output signal emitted by a current sensor connected in one of the network conductors, actuating a switch for switching off the main network conductors only if a value of the output signal of the current sensor is between a lower and an upper threshold value, wherein said lower threshold value represents a current that is of just no danger to a human body, and the upper threshold value represents a maximal allowable current value through a human body, at said given network voltage, rectifying the output signal of the current sensor in a rectifier, differentiating the rectified output signal in a differentiating section, supplying the rectified output signal to a discriminator circuit after differentiation, and limiting a window of the discriminator circuit by the lower and upper threshold values.

2. Method according to claim 1, which comprises supplying the rectified output signal of the current sensor to a peak-value forming circuit and then to the differentiating section.

3. Circuit configuration for detecting a current flowing over the human body between forward and return network conductors, and for switching off the network conductors, comprising a current sensor connected to one of the network conductors, means for setting upper and lower threshold values of an output signal of said current sensor, a switch connected to one of the network conductors, a differentiating section in the form of an RC section connected to said current sensor, and a discriminator circuit having first and second controllable semiconductor switches connected to said RC section, said first controllable semiconductor switch being turned on with a signal of said RC section above the upper threshold value for discharging an output voltage of said differentiating section to ground, and said second semiconductor switch being activated with a signal of said RC section between the upper and lower threshold values for activating said switch.

4. Circuit configuration according to claim 3, wherein said first controllable semiconductor switch is a thyristor having a gate terminal, and including a Zener diode connected to the gate terminal of said thyristor.

5. Circuit configuration according to claim 3, wherein said second controllable semiconductor switch is a transistor having a base terminal, and including an adjustable resistance voltage divider driving the base of said transistor.

6. Circuit configuration according to claim 3, wherein said second controllable semiconductor switch is a threshold-value transistor circuit.

7. Circuit configuration for detecting a current flowing over the human body between forward and return network conductors, and for switching off the network conductors, comprising a current sensor connected to one of the network conductors, means for setting upper and lower threshold values of an output signal of said current sensor, a switch connected to one of the network conductors, a rectifier connected to said current sensor for rectifying the output signal thereof, a differentiator connected to said rectifier for differentiating the rectified output signal, and a discriminator circuit connected to said differentiator having a window limited by the upper and lower threshold values.

8. Circuit configuration according to claim 7, wherein said rectifier, said differentiator, and said discriminator circuit, are formed of comparator and amplifier circuits.

9. Circuit configuration according to claim 7, wherein said rectifier, said differentiator, and said discriminator circuit, are formed of comparator circuits.

10. Circuit configuration according to claim 7, wherein said rectifier, said differentiator, and said discriminator circuit, are formed of amplifier circuits.

11. Circuit configuration according to claim 7, wherein said rectifier is a two-way rectifier, and including an input amplifier with over-voltage and short-circuit protection connected upstream of said rectifier.

12. Circuit configuration according to claim 11, including a smoothing peak-value forming circuit connected upstream of said differentiator.

13. Circuit configuration according to claim 12, including an evaluating circuit, and a block forming circuit connected between said discriminator circuit and said evaluating circuit for protected evaluation of the signal.

* * * * *